(12) United States Patent
Santry et al.

(10) Patent No.: US 6,778,504 B2
(45) Date of Patent: Aug. 17, 2004

(54) DYNAMIC SOFT PERMANENT VIRTUAL CIRCUIT BULK CONNECTION TRACING

(75) Inventors: James Matthew Santry, Almonte (CA); Kevin Scott Cutler, Ottawa (CA); Craig Murray Mansell Wilson, Ottawa (CA); Gerald Bloch, Ottawa (CA)

(73) Assignee: Alcatel Canada Inc., Kanata (CA)

(*) Notice: Subject to any disclaimer, the term of this patent is extended or adjusted under 35 U.S.C. 154(b) by 53 days.

(21) Appl. No.: 10/318,035

(22) Filed: Dec. 13, 2002

(65) Prior Publication Data

US 2004/0114580 A1 Jun. 17, 2004

(51) Int. Cl.[7] .............................................. H04L 12/26
(52) U.S. Cl. ..................... 370/252; 370/395.2; 370/355; 709/224; 709/238
(58) Field of Search ................................ 370/229–234, 370/241–258, 395.2–395.21, 401, 338–359; 709/203, 223, 224, 230, 240, 241

(56) References Cited

U.S. PATENT DOCUMENTS

| | | | | |
|---|---|---|---|---|
| 5,634,097 A | * | 5/1997 | Ashi et al. ..................... 714/45 |
| 5,896,496 A | * | 4/1999 | Suzuki ........................... 714/48 |
| 5,901,141 A | * | 5/1999 | Gruber et al. ............... 370/248 |
| 6,148,337 A | * | 11/2000 | Estberg et al. .............. 709/224 |
| 6,549,533 B1 | * | 4/2003 | Campbell ..................... 370/351 |
| 6,570,867 B1 | * | 5/2003 | Robinson et al. ........... 370/351 |
| 6,594,235 B1 | * | 7/2003 | Rochberger et al. ........ 370/238 |
| 6,643,267 B1 | * | 11/2003 | Karia et al. ................. 370/252 |

* cited by examiner

*Primary Examiner*—Douglas Olms
*Assistant Examiner*—Van Nguyen
(74) *Attorney, Agent, or Firm*—Marks & Clerk

(57) ABSTRACT

A bulk Soft Permanent Virtual Circuit (SPVC) trace processor is provided. The bulk SPVC trace processor receives notifications of newly established SPVCs and SPVC re-routing instances. The bulk SPVC trace processor submits SPVC connection trace commands to corresponding trace source network nodes, and retrieves trace transit list information therefrom. The aggregate SPVC transport path information derived from trace transit list information is stored and provided to higher network management and service provisioning functions. The bulk SPVC trace processor may also be employed to trace SPVC portions of Hybrid SPVCs. As SPVC connection tracing is necessary subsequent to a failure, load balancing techniques are used to spread SPVC connection tracing over time, network resources, and network partitions to prevent weighting down the network. Network planning and design functions previously built for Permanent Virtual Circuit (PVC) provisioning may be seamlessly upgraded in migrating to (H)SPVC connectivity.

28 Claims, 3 Drawing Sheets

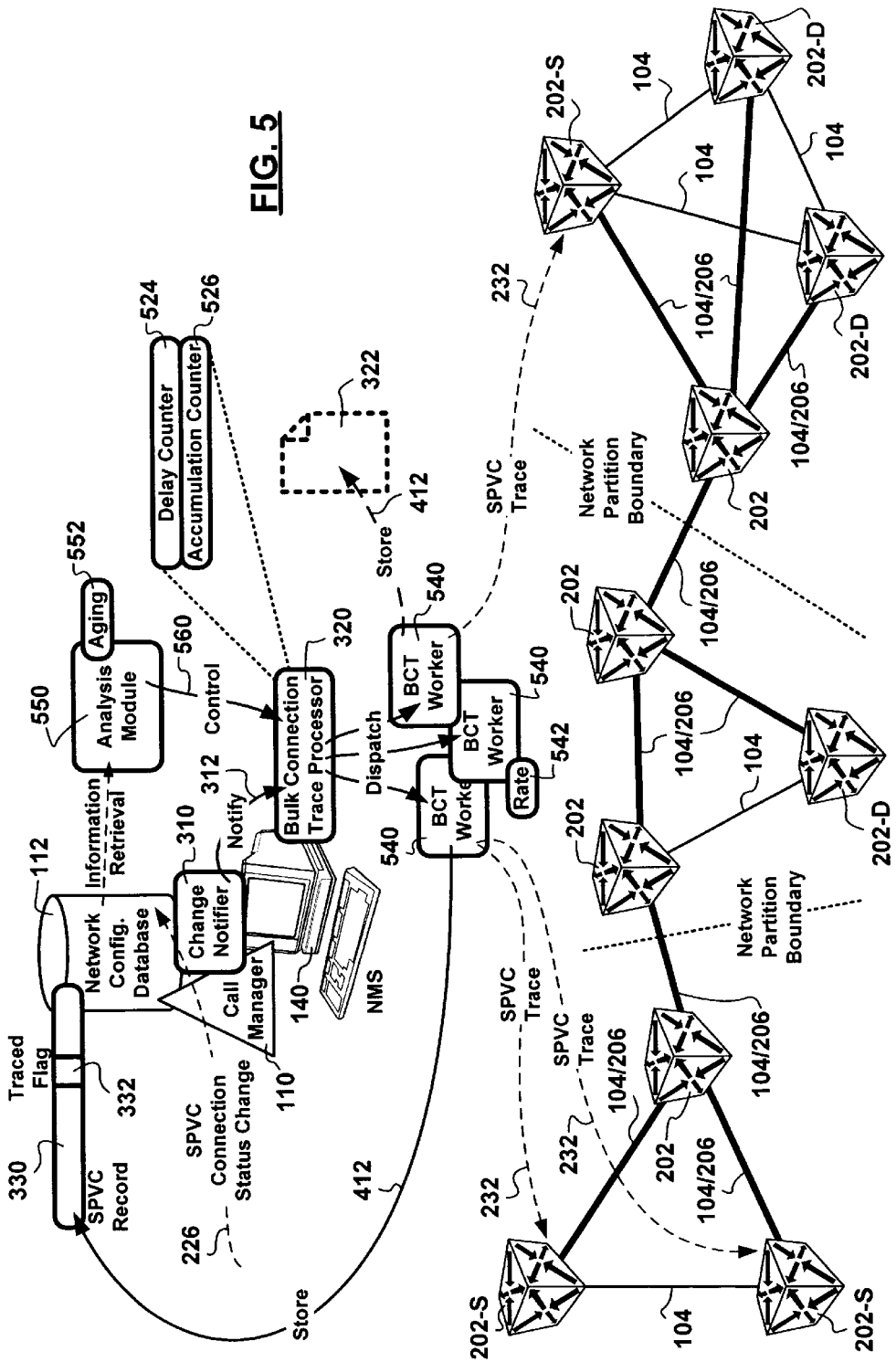

DYNAMIC SOFT PERMANENT VIRTUAL CIRCUIT BULK CONNECTION TRACING

FIELD OF THE INVENTION

The invention relates to communication networks, and in particular to methods and apparatus for tracing soft permanent virtual circuit connections.

BACKGROUND OF THE INVENTION

Asynchronous Transfer Mode (ATM) technologies have been developed to derive combined benefits from packet-switched technologies and circuit-switched technologies. Packet-switched technologies benefit from an efficient utilization of bandwidth. Circuit-switched technologies benefit from a high quality-of-service. ATM technologies employ fixed sized packets, known as cells, which are switched in an ATM network to follow Virtual Circuit (VC) transport paths.

FIG. 1 is representative of an ATM network 100 which includes ATM network nodes 102 and interconnecting links 104. Legacy ATM cell transport includes the use of pre-established Permanent Virtual Circuits (PVCs) 106 in the ATM network 100 provisioned over selected interconnecting links 104. The establishment of a PVC 106 is performed by a call manager entity 110 which has access to knowledge regarding: the topology of the managed ATM network, cell processing capacities of each managed network node, transport bandwidth capacities of each: managed interconnecting link, etc. The call manager 110 makes use of a network configuration database 112 to store and track provisioning information about the network 100.

If a connection is needed between any two ATM network nodes 102, a request 120 for establishing the connection is provided to the call manager 110. The request 120 includes a network address specification corresponding to the source network node 102-S requesting the establishment of the connection and a network address specification corresponding to the destination network node 102-D. The request may also specify resource utilization requirements including, but not limited to: a required average bandwidth, a maximum transport latency, a maximum jitter, etc.

The call manager 110, upon receiving the request 120 for establishing a connection, parses the request 120 to extract the source and destination network node addresses, and the resource utilization requirements. Based on the extracted information, and information held in the network configuration database 112, the call manager 110 attempts to determine 122 a transport path, of network nodes 102 and interconnecting links 104, which will have enough spare cell processing capacity at the network nodes 102, and enough transport bandwidth on the interconnecting links 104, to accommodate the new connection in the network 100. Once the transport path is determined 122, various commands are sent, via signaling messages 124, to the network nodes 102 in the transport path to reserve resources for PVC 106 to be established therebetween. Once all network nodes 102 in the transport path confirm the resource reservations, via return setup complete signaling messages 126, the PVC 106 is said to be established. The call manager 110 also updates 128 the network configuration database 112 with the particulars of the new PVC transport path.

Via a Network Management System (NMS) 140, network administrators 130 may be provided with a visual display 132 of all PVCs 106 in use in the network 100. The provisioning of the visual display 132 is possible due to the fact that all PVC transport path provisioning information is available centrally via the network configuration database 112. The availability of PVC transport path information stored in the network configuration database 112 enables micro-management of network resources.

Should any network infrastructure failures occur, network nodes 102 connected to the affected failed interconnecting links 104 or failed network nodes 102, inform the call manager 110 thereof, via signaling messages (not shown). The call manager 110 updates 128 the network configuration database 112 to reflect the failed equipment, determines the PVCs 106 which were provisioned via the failed network infrastructure, and the call manager 110 begins to reprovision (122, 124, 126, 128) all the affected PVCs 106 around the failed network infrastructure one-by-one in the same fashion presented above. Besides the deleterious effects of the infrastructure failure, a large amount of bandwidth is needed for the conveyance of signaling messages 124/126/128 to effect the reprovisioning of the affected PVCs.

A person of ordinary skill in the art understands that ATM technologies were devised to provision a large number of PVCs 106 in order to deliver high transport capacities. An infrastructure failure therefore affects a large number of PVCs 106 which the call manager 110 will have to reroute in a short period of time following the infrastructure failure to reduce cell loss.

There has been a trend towards conveying cells at ever increasing transport bandwidths over the interconnecting links 104, and employing network nodes 102 of higher and higher cell processing capacities. The processing requirements imposed on the call manager 110 can quickly stress the call manager entity to its processing limits especially when network failures occur. As the call manager 110 is associated with a network node 102-CM, an abnormal amount of signaling traffic processing is experienced by the network node 102-CM although the network node 102-CM may not be closely associated with the failed network infrastructure. The sequential transport path re-determination in healing the affected network 100 is considered very slow and typically leads to excessive cell loss.

In referring to FIG. 2, recent developments have brought about intelligent ATM network nodes 202 which led to intelligent networks 200. Intelligent ATM network nodes 202 use Private Network-Node Interface (PNNI) signaling to perform some of the tasks related to connection establishment, and connection rerouting in response to network failures. The transport path determination and reconfiguration performed by the intelligent network nodes 202 themselves, is enabled via the use of Soft Permanent Virtual Circuits (SPVC) 206. In the event of a network failure 208, benefits are derived from parallel transport path rerouting 210 which reduces the probability of cell loss. The use of SPVCs 206 provides connectivity resiliency by distributing SPVC connection re-routing processing overheads over many intelligent network nodes 202 in the network 200. For this reason SPVCs are also know colloquially as Smart PVCs.

In using SPVCs 206 to provision connectivity, the call manager 110 only keeps track of SPVC connectivity states at a high level—the task of ensuring low level physical SPVC connectivity being performed by the intelligent network nodes 202 themselves. The result is that the call manager 110 is informed 226 of the establishment of SPVCs 206 but not of the transport path used by the SPVCs. Therefore, in using SPVCs 206, the call manager 110 and the network configuration database 112, no longer have access to detailed connectivity information. Network administrators 130 can only engage in macro-management of network resources because the visibility of detailed connectivity information is diminished compared to what was previously enjoyed by using PVCs. As a result there is a reluctance to employ SPVCs 206 in provisioning connections over ATM infrastructure.

There is a strong demand to provide SPVC configuration visibility akin to PVC provisioning to enable micro-management of SPVC connections.

An extension to PNNI signaling has been described in af-cs-0141.000, "PNNI Addendum for Path and Connection Trace", Version 1.0, March 2000, which is incorporated herein by reference. Provisions are made for SPVC path tracing in troubleshooting connection establishment, and for SPVC connection tracing for discovering the transport path used by already established SPVC connections.

The very recent adoption of the af-cs-0141.000 extension to PNNI signaling has only benefited from a limited implementation. Prior art implementations enable a network administrator 130 to manually select 230, via a network management system 140 having access to the network configuration database 112, a single SPVC connection, and to manually issue a single SPVC connection trace command 232 to a single source trace node 202-S. The SPVC trace results are provided via a trace transit list and stored at the source trace node 202-S. The network administrator 130 needs to manually connect to the source trace node 202-S via an element management interface, manually retrieve the trace transit list, and interpret it. This implementation is inadequate in providing network-wide visibility of all active SPVC connectivity because of the large number (millions) of SPVCs 206 typically intended to be used.

There therefore is a need to address the above mentioned issues.

SUMMARY OF THE INVENTION

In accordance with an aspect of the invention, a bulk SPVC connection trace processor is provided. The bulk SPVC connection trace processor includes an information store, an accumulator, a dispatcher, and a collector. The information store tracks SPVC connection status change reports for a plurality of SPVC connections. The accumulator gathers a group of SPVC connection status change reports. The dispatcher is triggered by the accumulator to initiate the issuance of a plurality of SPVC connection trace commands to trace source network nodes corresponding to SPVC connections associated with in the group of SPVC connection status change reports. The collector accesses the trace source network nodes to retrieve trace transit list information and provides consolidated SPVC transport path information derived from the retrieved trace transit list information. The tracking of SPVC connection status change reports provides a dynamic response to SPVC connectivity changes in a managed network.

In accordance with another aspect of the invention, the bulk SPVC connection trace processor further includes a control interface to receive SPVC connection tracing requests for a selection of SPVC connections.

In accordance with a further aspect of the invention, a method of tracing a plurality of SPVC connections is provided. Received SPVC connection status change reports corresponding to a multitude of SPVC connections are tracked. A group of received SPVC connection status change reports is accumulated. SPVC connection tracing commands are dispatched to a group of trace source network nodes provisioning SPVC connections corresponding to the group of accumulated SPVC connection status change reports. And, trace transit list information is collected from the group of trace source network nodes. The tracking of received SPVC connection status change reports provides a dynamic response to SPVC connectivity changes in a managed network.

In accordance with yet another aspect of the invention, the trace transit list information for each traced SPVC is stored to provide connectivity information akin to that typically available for PVCs.

The advantages are derived by network administrators, higher network management and service provisioning functions, being provided with the same level of transports path information detail previously enjoyed in using PVCs. Network planning and design functions previously built for PVC provisioning may be seamlessly upgraded in migrating to SPVC connectivity.

By engineering the execution of bulk SPVC connection tracing, a minimized effect is felt by the network management and service provisioning tasks, enabling a large number of SPVC connections to be traced and thereby removing a major roadblock to large scale SPVC deployment.

BRIEF DESCRIPTION OF THE DRAWINGS

The features and advantages of the invention will become more apparent from the following detailed description of the preferred embodiments with reference to the attached diagrams wherein:

FIG. 5 is a schematic diagram showing elements providing processing load distributed bulk SPVC connection tracing, in accordance with various exemplary implementations of the invention.

It will be noted that in the attached diagrams like features bear similar labels.

DETAILED DESCRIPTION OF THE EMBODIMENTS

Figure 3:
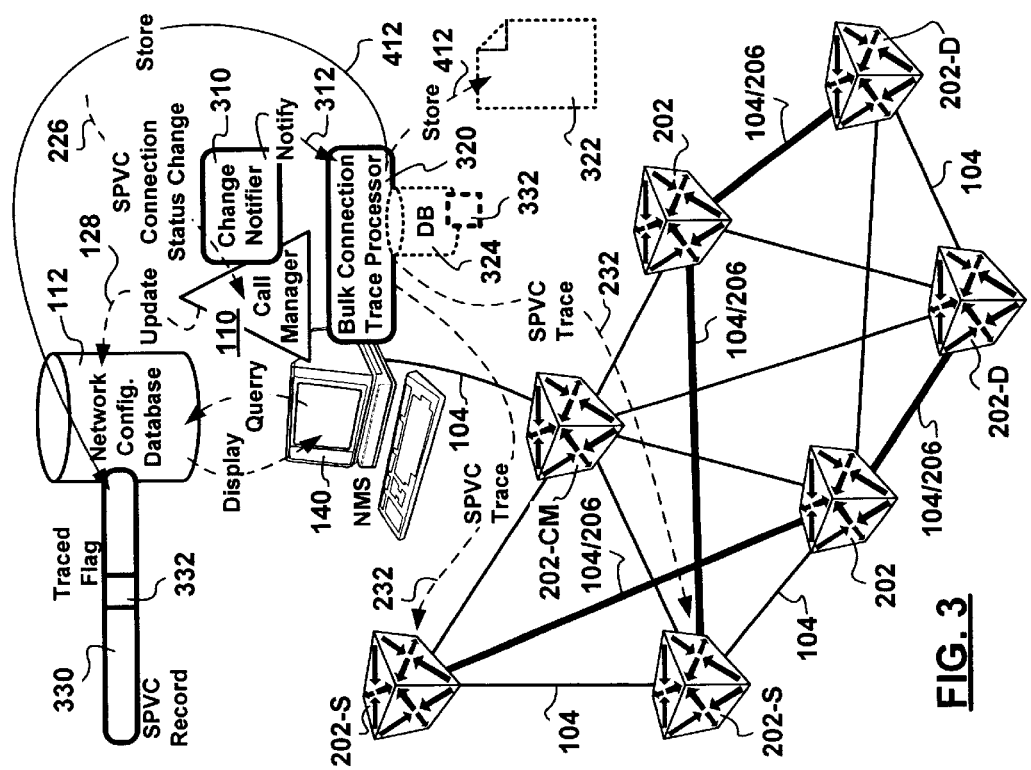
FIG. 3 is a schematic diagram showing, in accordance with an exemplary embodiment of the invention, interacting elements providing bulk SPVC connection tracing.

A dual benefit is sought: that of a reduced processing overhead derived by using SPVCs, and that of having access to full network-wide PVC-style transport path information for provisioned SPVCs. As contradicting requirements as these may seem in view of the current state of the art, an exemplary solution is described herein:

FIG. 3 is a schematic diagram showing interacting elements providing bulk SPVC connection tracing.

Figure 2:
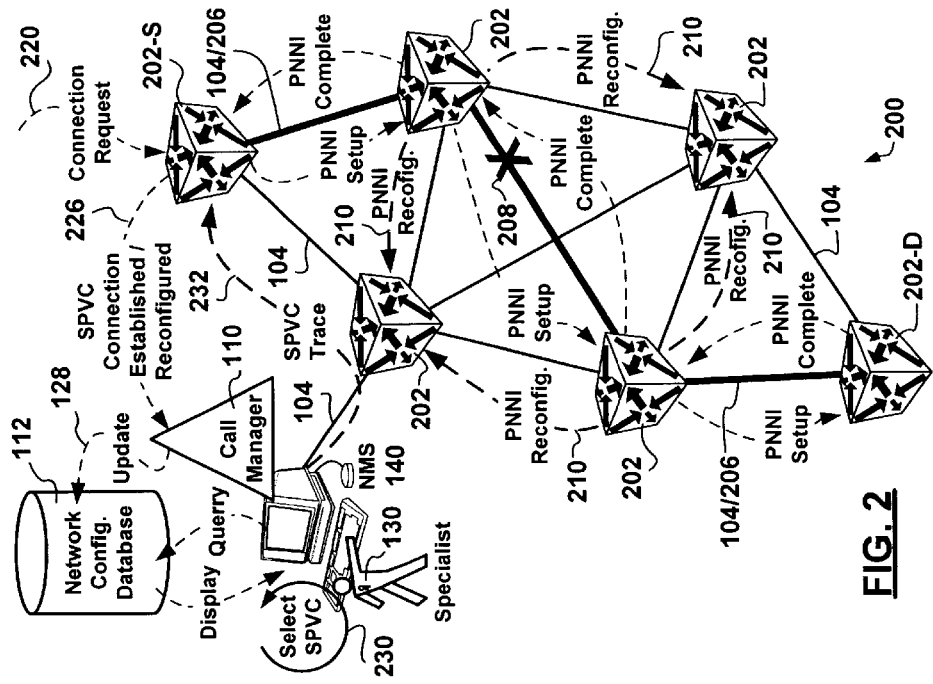
FIG. 2 is a schematic diagram showing elements implementing an exemplary intelligent ATM network and exemplary PNNI signaling used in provisioning SPVC connections.
Figure 1:
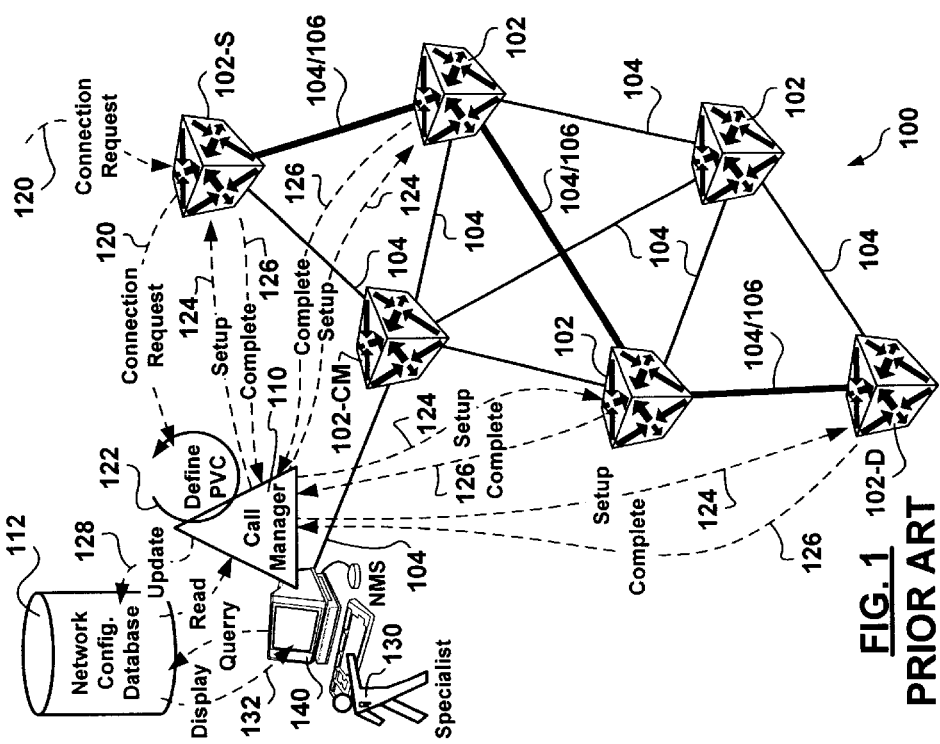
FIG. 1 is a schematic diagram showing elements implementing an exemplary ATM network and exemplary signaling used in provisioning PVC connections.

In accordance with a preferred embodiment of the invention, the reporting functionality 226 (see FIG. 2), used by intelligent network nodes 202 to inform the call manager 110 of the establishment of each new SPVC connection and/or of the re-routing of each SPVC connection affected by network failures, is tapped and used to trigger the issuing of SPVC connection trace commands. Trace transit list information is retrieved to derive SPVC transport path information therefrom.

It is important to minimize the involvement of the call manager 110 in SPVC connection: tracing due to a time critical operation thereof. The call manager 110 is (preferably) only involved in updating SPVC provisioning states in the network configuration database 112. A change notifier 310 is exemplary associated with the call manager 110, monitors signaling traffic conveyed to the call manager 110, and generates SPVC status change notifications 312 for each SPVC connection status change report 226. Therefore, SPVC connection status change notifications 312 are generated for each new SPVC connection establishment report and/or for each SPVC connection rerouting report.

The SPVC connection status change notifications 312 are provided to a Bulk Connection Trace (BCT) processor 320 which is adapted to send (406) SPVC connection trace commands 232 to trace source network nodes 202-S, retrieve trace transit lists from the respective trace source network nodes 202-S, and store (412) the trace transit list information. In accordance with another exemplary implementation, the BCT processor 320 is also notified 312 of SPVC trace completions.

The use of the BCT processor 320 ensures the use of minimal processing resources from the call manager 110. The BCT processor 320 may be implemented as part of the network management system 140. Alternatively the BCT processor 320 may be implemented on an off-board independent platform to ensure minimal processing resource utilization from time critical operation of the call manager 110, and/or the network management system 140. The implementation choice is not intended to limit the invention. Both the NMS 140, call manager 110, and the BCT processor 320 will have response time requirements, resource utilization requirements, etc. which factor into design choices. The BCT processor 320 may include a BCT software application implementing bulk SPVC connection trace logic.

Figure 4:
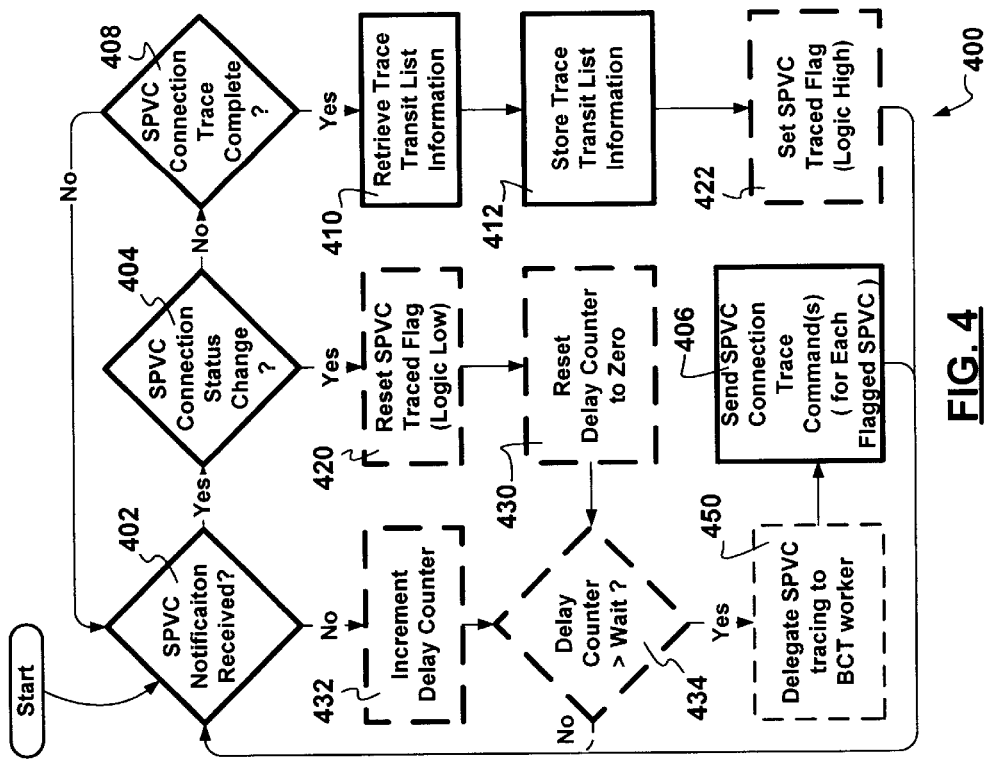
FIG. 4 is a schematic flow diagram showing process steps implementing bulk SPVC connection tracing, in accordance with various exemplary implementations of the invention.

FIG. 4 is a schematic flow diagram showing process steps implementing bulk SPVC connection tracing.

The overall process 400 performed by the BCT processor 320 (shown in solid outlined process steps) involves, waiting for the receipt of notifications 312, which is exemplary shown at 402. Once a notification 312 is received, the BCT processor 320 determines, in step 404, whether the notification 312 corresponds to an SPVC connection status change report.

Regardless of whether the SPVC connection status change notification 312 corresponds to a new SPVC establishment report 226 or an SPVC reconfiguration report 226, the operation of the BCT processor 320 results in sending 406 a SPVC connection trace command (232) to a trace source network node (202-S) corresponding to the changed SPVC. In sending 406 the SPVC connection trace command, the BCT processor 320 (either directly or indirectly through the network management system 140) may consult the network configuration database 112 to determine at least a network address of the trace source network node 202-S, if not already specified in the notification 312.

If the notification 312 corresponds to an SPVC trace completion report of a previously sent SPVC connection trace command 232, fact ascertained in step 408, the BCT processor 310, retrieves 410 the trace transit list information from the source trace network node 202-S corresponding to the traced SPVC connection.

The BCT processor 320 also stores 412 the retrieved trace transit list information in retrievable storage. Making reference to FIG. 3, the implementation of step 412 may employ a file 322. The file 322, without limiting the invention, includes a text file having a human readable format. A time stamp may be stored in the file 322, along with SPVC transport path information, the value specified by the time stamp corresponding to the network time when the file 322 was last updated. The actual format of the file 322 is left to design choice which typically conforms to requirements imposed by further use of the file 322, may include the use of binary files formats, and described elsewhere.

In accordance with an exemplary implementation of the invention, the step 412 may involve the storage of the retrieved trace transit list information in the network configuration database 112 more particularly in corresponding SPVC records 330.(also known generically as call records), to track the transport path information. The stored SPVC transport path information may be equivalent to PVC transport path information. Populating SPVC records 330 with trace transit list information, enables network administrators 130 to have access to combined PVC and SPVC transport path information and therefore provides access to detailed network resource utilization and routing of connections in support of micro-management.

The network configuration database 112 therefore, as far as SPVC connectivity information is concerned, will be updated in close to real-time.

In accordance with another embodiment of the invention, an engineered response is provided in performing bulk SPVC connection tracing. As mentioned, network failures lead to a high level of PNNI signaling exchange. Burdening the network with SPVC connection tracing in bulk at the same time the network attempts to heal itself from the network failure, would further negatively impact the operation of the network 300. Therefore, there is a need for a less intrusive solution as uncontrolled bulk SPVC connection tracing may lead to very intensive use of the available signaling bandwidth.

In accordance with an exemplary implementation of the invention, each SPVC record 330 in the network configuration database 112 has a corresponding special purpose SPVC connection traced specifier 332. Various implementations of the SPVC connection traced specifier 332 may be employed without limiting the invention thereto; for example a single bit register, also referred to as a flag, may be used.

In accordance with another exemplary implementation of the invention, the BCT processor 320 makes use of storage resources 324 associated therewith in tracking SPVC connections for tracing purposes to minimize access to the network configuration database 112. The structure of the information held in the storage 324 is not intended to limit the invention, nor is the actual type of information stored. At least specifiers 332 are stored in the storage 324 to identify SPVC connections to be traced. In accordance with another implementation of the invention the storage 324 may simply buffer SPVC related information stored in the network configuration database 112.

Referring to FIG. 4 and making additional reference to process steps shown in heavy interrupted outline, upon receiving an SPVC connection status change notification 312 from the change notifier 310, step 404, the BCT processor 320 accesses the network configuration database 112 (324), based on the SPVC identified in the notification 312, to reset 420 the corresponding SPVC traced flag 332. If a bit register is employed, a logic low value stored therein would signify that the SPVC connection needs to be traced. Conversely, a logic high value would signify that the SPVC connection has been traced (at least recently).

When an SPVC connection trace complete notification 312 is received, step 408, either from the source trace network node 202-S, for example, or by other means without limiting the invention thereto, and the trace transit list is stored 412, the BCT processor 320, sets 422 the corresponding SPVC traced flag 332. The assertion of the SPVC traced flag 332 signifies that the SPVC connection has been traced and that the connectivity information available (either in the network configuration database 112, in the file 332, or in the retrievable storage 324) corresponds to SPVC physical connectivity in the network 300.

Provisions may also be made for resetting the SPVC traced flag 332 when each SPVC record 330 is created: for example by ascribing a default logic low value thereto. Therefore on start-up or restart of the solution, all active SPVCs in the network 300 would be retraced to update all SPVC records 330.

Having provided for the identification of SPVC records 320 requiring transport path information updates via the use of the SPVC traced flags 332, the BCT processor 320, in providing the engineered response, is therefore enabled to accumulate SPVC status change notifications 312.

In accordance with an exemplary implementation of the invention, sending out SPVC connection trace commands 406 is delayed for a waiting period during which the network 300 is expected to heal itself from network failures (208). The speed at which a network is expected to heal itself is a combination of: the number of interconnecting links 104 affected, the number of nodes 102/202 affected, the number of connections 106/206 affected, etc. (It is envisioned that PVCs and SPVCs may be used concurrently.) Tolerated network-down time is also typically specified in service level agreements.

In accordance with an exemplary implementation and making reference to both FIG. 4 and FIG. 5, the delay in sending out 406 SPVC trace commands 232 is provided via a delay counter 524. The delay counter 524 is reset to zero 430 with each SPVC status change notification received (404) and incremented 432 during BCT processor 320 idling periods. If the value of the delay counter 524 reaches a predetermined "Wait" delay threshold time value, as ascertained in step 434, then SPVC connection trace commands 232 are sent 406 for each flagged SPVC (332). The delay threshold time value is a design choice. Without limiting the invention, typical delay threshold time values would be in the order of minutes.

It would be apparent to a person skilled in the art, that a lot of SPVC connection status change notifications 312 would be accumulated, without performing any SPVC connection tracing, if a long period of intense SPVC connection status change notification 312 receipts is experienced. Depending on the required response of the BCT processor 320, the use of the delay counter 524 may be augmented with, or replaced by, the use of a notification accumulation counter 526. Only once the BCT processor 320 has gathered a predetermined number (accumulation threshold) of received SPVC connection status change notifications 312 would the BCT processor 320 send 406 the SPVC connection trace commands (232) for each flagged 322 SPVC record 330.

In accordance with another implementation of the invention, SPVC connection tracing may be aged (552). At the expiration of a predefined information aging time period, the BCT processor 320 may be triggered 560 to update all SPVC connections in the network 300. As mentioned above network-wide SPVC connection tracing may involve upwards of a million SPVCs 206 and may take a few hours to complete. The completion time is dependent on the processing power of the BCT processor 320, the spare signaling bandwidth available in the network 300, the available bandwidth in accessing the network configuration database 112, etc.

In accordance with the exemplary embodiment of the invention, the engineered response takes into account the facts that long bulk SPVC connection tracing jobs typically generated by: network failures, the above mentioned solution restarts, and large SPVC connection tracing requests, if not controlled, all lead to large bursts of signaling traffic in the network 300 (either immediate or delayed).

In accordance with another exemplary embodiment of the invention, the BCT processor 320 makes further use of multiple BCT workers 540, to employ a divide-and-conquer approach in spreading the bulk SPVC trace processing over combinations of time, processing resources, network nodes, and/or managed network domains/partitions. The use of the BCT processor 320 and BCT workers 540 in combination enables the BCT processor 320 to fully concentrate on processing received notifications 312 and to pace SPVC tracing by delegating SPVC connection tracing 450 to BCT workers 540 appropriately. In accordance with a further enhancement, each BCT worker 540 may further be adapted to send SPVC trace commands 232 at an adjustable rate 542. Typically each BCT worker 540 may be implemented as an executable software application. The use of BCT workers 540 enables topology aware and/or weighted processing of SPVC connection tracing commands providing load balancing.

The accumulation of notifications 312, enables each BCT worker 540 to be given a group of SPVCs 206 to trace, the engineered response is therefore provided via effecting control over: the extent of the accumulation of notifications 312, the grouping of SPVCs 206 requiring tracing, timely spawning 450 each BCT worker 540, the rate 542 at which BCT workers 540 send 406 SPVC connection trace commands 232, etc. The grouping of SPVCs 206 for delegated processing by BCT workers 540, without limiting the invention, may be implemented in accordance with trace source network node associativity and/or network partition associativity. Having a group of SPVC connections 206 to be traced, the actual combined SPVC connection tracing may be performed serially or in parallel.

On sending out all SPVC connection trace commands 232, each BCT worker 540 may be adapted to generate the above mentioned SPVC connection traced notification(s) 312, for example by issuing a "done" signal. It is recognized that the sending of the done signal may not be correlated with the availability of trace transit lists at source trace nodes 202-S. It is intended that in sending of the done signal, after all SPVC connection trace commands 232 have been dispatched (406), sufficient time has been given for at least the first SPVC connections 206 in the delegated SPVC group to have completed connection tracing.

In accordance with the exemplary embodiment of the invention the BCT workers 540 may be entrusted with the retrieval 410 of trace transit lists, the storage 412 of the SPVC transport path information, and the setting 422 of corresponding SPVC traced flags.

In accordance with a further embodiment of the invention, an analysis module 550 may be employed for interacting 560 with the BCT processor 320, and the BCT processor 320 may further implement an interface having control parameters for interaction therewith, in tailoring the operation of the BCT processor 320.

Without limiting the invention, the analysis module 550 may be concerned less with attending to notifications 312 and perhaps more concerned with correlations that may be derived from SPVC connections status changes. The exemplary analysis module 550 may have independent access to the network configuration database 112. The above mentioned exemplary aging function 552, maybe implemented in the analysis module logic.

The interface implemented by the BCT processor 320 may include the processing of messages 560 requesting the tracing of a specific group of SPVC connections 206 regardless of the current status of the SPVC traced flags 332. The aging function 552 therefore may be implemented by requesting tracing of the group of all provisioned SPVCs. Care must be taken in issuing such a command to the BCT processor 320 as such an SPVC connection tracing request may involve millions of SPVC connections 206 and it is suggested that such SPVC tracing be limited to a day.

The change notifier 310 presented above was described as being associated with the call manager 110. The described association is not intended to limit the invention thereto. As shown in FIG. 5, a more generic purpose change notifier 310 may be associated with the network configuration database 112 to track changes to network configuration database records including SPVC records 330. The BCT processor 320 would register with the generic change notifier 310 to receive the notification 312.

A person of skill in the art would understand that the apparatus and methods presented herein above apply equally well to Hybrid SPVCs (HSPVCs). An HSPVC is a hybrid connection which has at last one PVC portion and at least one SPVC portion. The transport path information regarding the PVC portion is held in the network configuration database 112 including the PVC-end network nodes 102/202. HSPVC connection tracing involves issuing the connection trace command(s) 232 to PVC end-network node(s) 202-S of the SPVC connection portion(s).

The embodiments presented are exemplary only and persons skilled in the art would appreciate that variations to the above described embodiments may be made without departing from the spirit of the invention. The scope of the invention is solely defined by the appended claims.

We claim:

1. A bulk SPVC connection trace processor comprising:
   a. an information store tracking SPVC connection status change reports for a plurality of SPVC connections;
   b. an accumulator gathering a group of SPVC connection status change reports; and
   c. a dispatcher triggered by the accumulator to initiate the issuance of a plurality of SPVC connection trace commands to trace source network nodes corresponding to SPVC connections associated with in the group of SPVC connection status change reports;
the tracking of SPVC connection status change reports provides a dynamic response to SPVC connectivity changes in a managed network.

2. A bulk SPVC connection trace processor as claimed in claim 1, further comprising a collector accessing the trace source network nodes to retrieve trace transit list information and providing consolidated SPVC transport path information derived from the retrieved trace transit list information.

3. A bulk SPVC connection trace processor as claimed in claim 1, wherein each SPVC connection status change report comprises one of a new SPVC connection establishment report and an SPVC connection re-routing report, thereby minimizing processing overheads in providing the dynamic response to changes in SPVC connectivity in the managed network.

4. A bulk SPVC connection trace processor as claimed in claim 2, wherein the information store comprises a connection traced specifier for each one of the plurality of SPVC connections, the connection traced specifiers identifying SPVC connections having experienced at least one SPVC connection status change.

5. A bulk SPVC connection trace processor as claimed in claim 4, wherein the connection trace specifier further comprises a bit register; a logical low value of which signifies that the corresponding SPVC connection has experienced a change, and a logical high value of which signifies that the corresponding SPVC connection has recently been traced.

6. A bulk SPVC connection trace processor as claimed in claim 1, wherein the accumulator further comprises a delay counter and a delay threshold value defining a lag time period from a last received SPVC connection change report, if a plurality of SPVC connection status change reports are received at a rapid rate, the issuing SPVC connection trace commands is delayed until after the expiration of the lag time period preventing a large amount of signaling traffic from weighting down the managed network.

7. A bulk SPVC connection trace processor as claimed in claim 1, wherein the accumulator further comprises an SPVC connection status report counter and a report count threshold value defining the size of the gathered group of SPVC connection status change reports, if a plurality of SPVC connections status change reports are received, the issuing SPVC connection trace commands is delayed in gathering the group of SPVC connections status change reports while ensuring that SPVC connection tracing ensues.

8. A bulk SPVC connection trace processor as claimed in claim 1, wherein the bulk SPVC connection trace processor further comprises a control interface to receive SPVC connection tracing requests for a selection of SPVC connections.

9. A bulk SPVC connection trace processor as claimed in claim 1, wherein the bulk SPVC connection trace processor further comprises at least one bulk SPVC connection trace worker component, each bulk SPVC connection trace worker component being invoked by the dispatcher to perform SPVC connection tracing for at least a subgroup of SPVC connections to spread bulk SPVC connection tracing over a combination of time periods, processing resources, network nodes, and managed network partitions, providing a topology aware load balanced dynamic response.

10. A bulk SPVC connection trace processor as claimed in claim 9, wherein the bulk SPVC connection trace worker component further comprises an SPVC trace rate specifier for issuing SPVC connection trace commands at a specified rate, the pacing of the issuance of SPVC connection trace commands spreading processing overheads associated with SPVC connection tracing over time.

11. A bulk SPVC connection trace processor as claimed in claim 1, wherein the SPVC connections include SPVC portions of Hybrid SPVC connections.

12. A method of tracing a plurality SPVC connections comprising the steps of:
   a. tracking received SPVC connection status change reports corresponding to a plurality of SPVC connections;

b. accumulating a group of received SPVC connection status change reports; and c. dispatching SPVC connection tracing commands to a group of trace source network nodes provisioning SPVC connections corresponding to the group of accumulated SPVC connection status change reports;

the tracking of received SPVC connection status change reports provides a dynamic response to SPVC connectivity changes in a managed network.

13. A method of tracing a plurality SPVC connections as claimed in claim 12, the method further comprising a step of: collecting trace transit list information from the group of trace source network nodes.

14. A method of tracing a plurality SPVC connections as claimed in claim 13 wherein subsequent to collecting trace transit list information, the method further comprises a step of: storing trace transit list information.

15. A method of tracing a plurality SPVC connections as claimed in claim 14, wherein storing trace transit list information, the method further comprises a step of: writing consolidated SPVC transport path information to a file.

16. A method of tracing a plurality SPVC connections as claimed in claim 14, wherein storing trace transit list information, the method further comprises a step of: updating a network configuration database with SPVC transport path information, enabling central access to SPVC connectivity information.

17. A method of tracing a plurality SPVC connections as claimed in claim 13, the method further comprises a step of: receiving a SPVC connection trace command submission completion reports.

18. A method of tracing a plurality SPVC connections as claimed in claim 12, wherein tracking the plurality of SPVC connection status change reports, the method further comprises a steps of:

a. tapping signaling information conveyed in the managed network corresponding to a one of SPVC connection path re-routing and new SPVC connection establishment; and b. issuing corresponding SPVC connection status change reports;

the tapping of signaling information ensuring minimal processing resource utilization from time critical operation of a network management and service provisioning solution.

19. A method of tracing a plurality SPVC connections as claimed in claim 12, wherein tracking SPVC connection status change reports, the method further comprises a step of: buffering SPVC connection status change report information to reduce SPVC trace processing overheads.

20. A method of tracing a plurality SPVC connections as claimed in claim 12, wherein tracking SPVC connection status change reports, the method further comprises a step of: updating connection traced specifiers corresponding to SPVC connections, the connection traced specifiers identifying SPVC connections having experienced at least one SPVC connection status change.

21. A method of tracing a plurality SPVC connections as claimed in claim 20, the method further comprises a steps of:
p1 a. receiving an SPVC connection trace request; and b. updating the connection traced specifier corresponding to the SPVC connection to cause the SPVC connection to be traced.

22. A method of tracing a plurality SPVC connections as claimed in claim 21, further comprising the step of: updating all SPVC traced specifiers on start-up to cause the tracing of all SPVC connections network wide.

23. A method of tracing a plurality SPVC connections as claimed in claim 20, the method further comprising a step of: updating SPVC traced specifiers signifying that the corresponding SPVC connections have been traced subsequent to collecting trace transit list information.

24. A method of tracing a plurality SPVC connections as claimed in claim 12, wherein accumulating received SPVC connection status change reports, the method further comprises a step of: delaying the dispatch of SPVC connection trace commands for a predetermined delay time period to prevent a large amount of signaling traffic from weighting down the managed network.

25. A method of tracing a plurality SPVC connections as claimed in claim 24, wherein delaying the dispatch of SPVC connection trace commands, the method further comprises a steps of:

a. resetting a delay counter with each received SPVC connection status change report; and b. triggering the dispatch SPVC connection trace commands for SPVC connections corresponding to the group of received SPVC connection status change reports, if an idle time period longer than the predetermined delay time period ensues.

26. A method of tracing a plurality SPVC connections as claimed in claim 12, wherein dispatching SPVC connection trace commands for the accumulated group of SPVC connection change reports, the method further comprises a step of: dividing the corresponding group of SPVC connections to be traced in accordance with one of a trace source network node association and a network partition association.

27. A method of tracing a plurality SPVC connections as claimed in claim 26, dispatching SPVC connection trace commands, the method further comprises a step of: delegating at least bulk SPVC connection trace worker to effect SPVC connection tracing to distribute the SPVC connection trace processing load, providing parallel SPVC connection tracing in employing at lest two bulk SPVC connection trace workers.

28. A method of tracing a plurality SPVC connections as claimed in claim 27, wherein delegating SPVC connection tracing to an SPVC connection trace worker, the method further comprises a step of: issuing a completion report subsequent to submitting all SPVC trace command assigned.

* * * * *